A. H. STUART.
TEMPO CONTROLLER FOR AUTOMATIC PIANOS.
APPLICATION FILED APR. 5, 1909.
962,537.
Patented June 28, 1910.
2 SHEETS—SHEET 1.
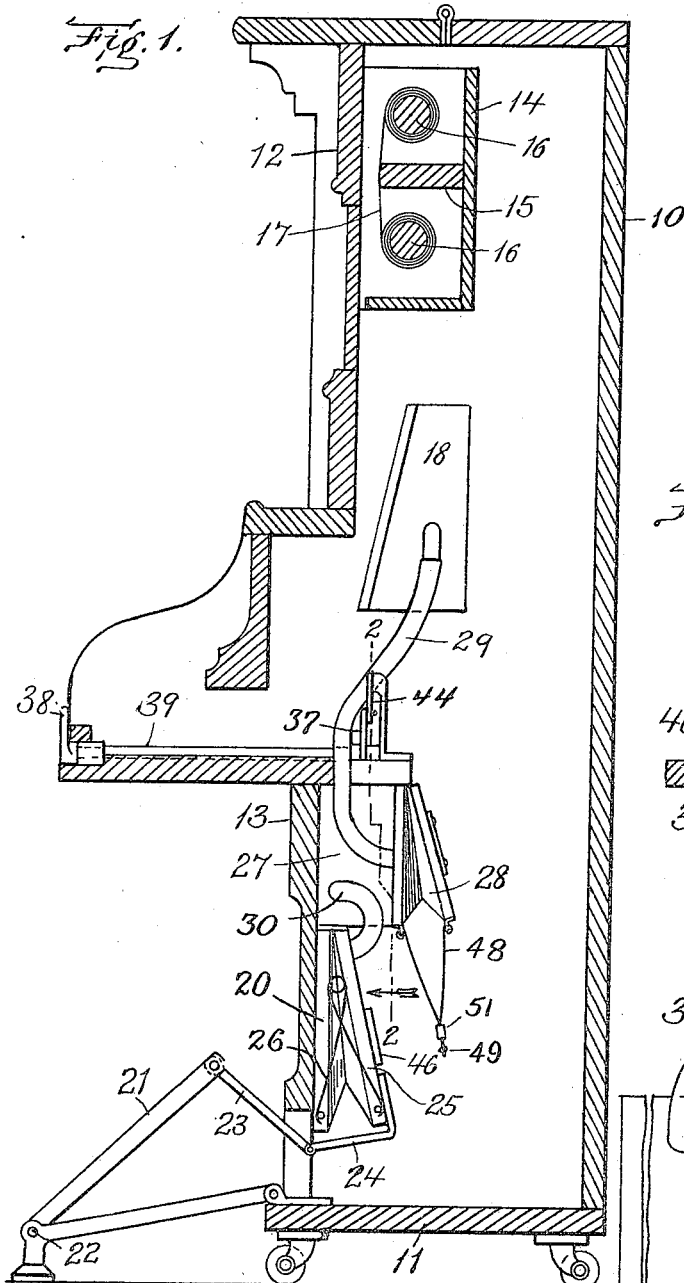
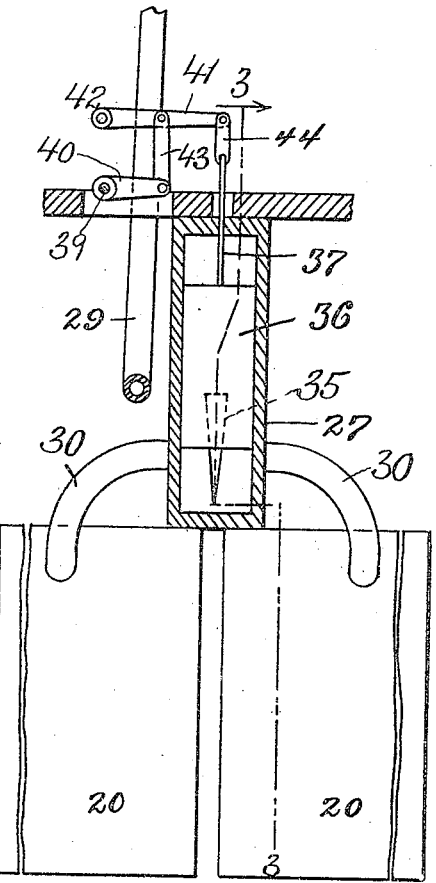
Witnesses:
P. N. Pezzetti
F. R. Rouletene
Inventor.
ALBERT H. STUART
by Wright Brown Quimby May
Attorneys A. H. STUART.
TEMPO CONTROLLER FOR AUTOMATIC PIANOS.
APPLICATION FILED APR. 5, 1909.
962,537.
Patented June 28, 1910.
2 SHEETS—SHEET 2.
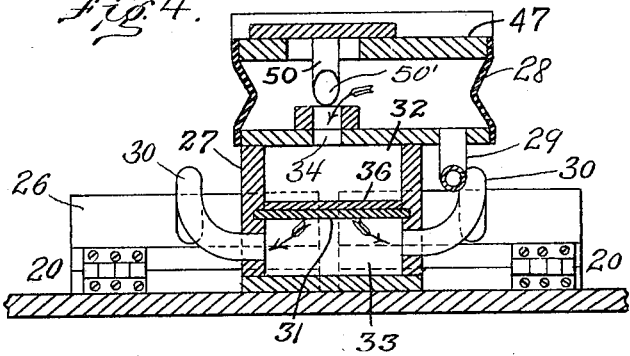
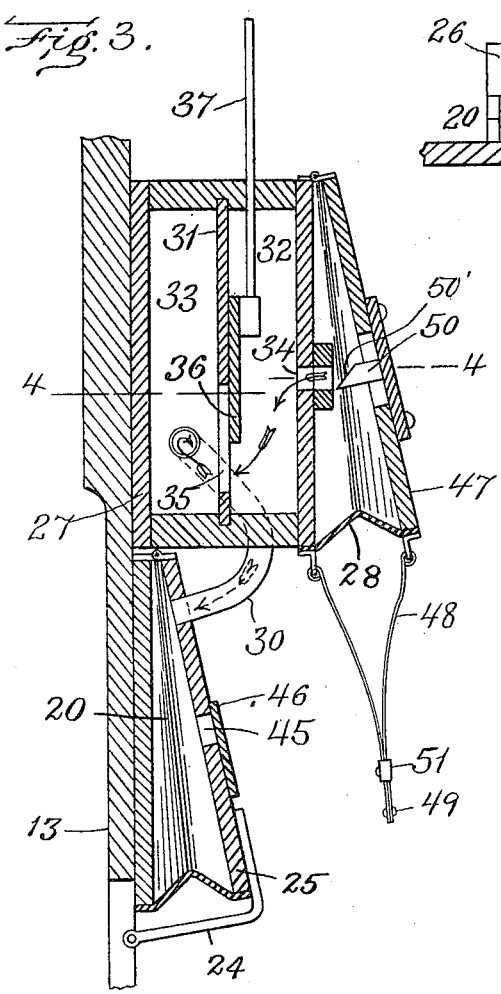
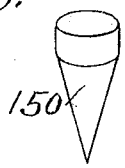
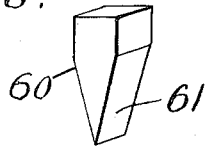
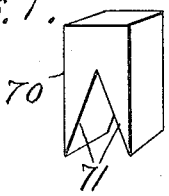
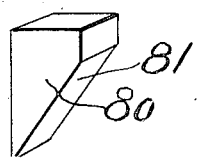
Witnesses.
P. N. Pizzetti
F. R. Roristone
Inventor.
ALBERT H. STUART
by Wright Brown Quinby May
Attorneys

UNITED STATES PATENT OFFICE.

ALBERT H. STUART, OF BOSTON, MASSACHUSETTS.

TEMPO-CONTROLLER FOR AUTOMATIC PIANOS.

962,537.  Specification of Letters Patent.  Patented June 28, 1910.

Application filed April 5, 1909. Serial No. 488,087.

*To all whom it may concern:*

Be it known that I, ALBERT H. STUART, of Boston, in the county of Suffolk and State of Massachusetts, have invented certain new and useful Improvements in Tempo-Controllers for Automatic Pianos, of which the following is a specification.

This invention relates to automatic pianos and has for its object to provide means for automatically controlling the tempo so as to compensate for variations in the speed of the main exhaust pump.

An automatic piano includes in its organization a tracker board and a traveling perforated sheet coöperative with the tracker board for controlling the hammers. It also includes winding rolls for the perforated sheet, a pneumatic motor for the winding rolls, and an exhaust pump connected with the motor by a conduit for driving the motor. The exhaust pump is usually actuated by pedal levers and may be actuated at any desired speed at the will of the operator. There is usually included in the conduit between the exhaust pump and the motor a tempo valve adapted to be operated by a hand lever for controlling the flow of air to the exhaust pump, and thereby controlling the speed of the motor and the speed of the perforated sheet. The motor however, is subject to variations in speed when the tempo valve remains in one position and when the speed of the exhaust pump is varied. Without some automatic means for compensating for variations in speed of the pump, the motor is bound to operate unevenly.

A patent issued April 19, 1892, No. 473,338 and a patent issued May 19, 1896, No. 560,303 include pneumatic controllers for automatically controlling the speed of the motor of an automatic piano. In each of said patents the controlling valve is of a sliding type, and coöperates with a partition having a circular port or wind passage. The valves in these patents require lubrication to facilitate their movement, but the lubrication becomes worn away in time and the valves which are forced against their seats by the vacuum frequently stick. Climatic changes are another cause for the sticking of these valves. The present invention provides a valve which is similar in effect to the sliding valves of said patents. The valve of the present invention, however, is so constructed and arranged as to avoid the objection due to sticking or binding. The sticking or binding of the valve is avoided by forming the valve so that it may enter the port or wind passage and by mounting it directly upon the movable leaf of the controlling pneumatic, and by arranging the pneumatic so that the valve is moved longitudinally into and out of the port or wind passage. The valve does not have physical contact with the member in which the port or wind passage is formed because the circular diameter is slightly less than the diameter of the port, and the valve is arranged so that it may have a slight clearance at all points. The automatic valve is provided in addition to, and not by way of substitution for, the usual tempo valve which may be actuated manually for increasing or diminishing the capacity of the air conduit.

I have found the most successful means for automatically controlling the flow of air to be a valve formed with a controlling face which is oblique to the direction of movement, and of which the width decreases toward the rear. The cross section of the valve may be circular or polygonal, and if it be the latter the decreasing width of the controlling face is procured by arranging said face so that it terminates coincidentally with an angle of the cross-section. The means shown for moving the valve comprise a pneumatic included in the exhaust conduit between the motor and the manual tempo-valve and which has a port formed in one leaf and which has a valve mounted on the other leaf so as to be adapted to enter the port.

Of the drawings which illustrate one form in which the invention may be embodied, Figure 1 represents in vertical section, the essential parts of a piano case and the several operative parts of an automatic player to which this invention relates. Fig. 2 is a section on line 2—2 of Fig. 1. Fig. 3 is a section on line 3—3 of Fig. 2. Fig. 4 is a section on line 4—4 of Fig. 3. Figs. 5, 6, 7 and 8 are perspective views of various forms of controlling valves.

The same reference characters indicate the same parts wherever they occur.

Fig. 1 shows a piano case 10 having a floor 11, an upper front panel 12, and a lower front panel 13. Inclosed within the case is a frame 14 in which are mounted a tracker board 15 and a pair of winding rolls 16, one on either side of the tracker board. 17 represents a perforated music sheet adapted to coöperate with the tracker board and to be wound upon the rolls 16. 18 is a conventional representation of a pneumatic motor for driving the winding rolls and is presumably equipped with appropriate power transmitting mechanism not shown. 20 represents an exhaust pump of the bellows type which is adapted to be actuated by a pedal lever 21. It is the usual practice to provide two bellows 20 and a separate pedal 21 for each. The pedals are mounted upon a fulcrum 22 and are connected by pivoted links 23 with arms 24 depending from the movable leaves 25 of the bellows. The bellows may be provided with springs 26 arranged so as to exert their tension, tending to close them, the opening of the bellows being effected by a downward pressure upon the pedals.

The exhaust pump, including the two bellows, is connected with the motor 18 by a continuous air conduit which, as here shown, comprises an exhaust chest 27, a pneumatic 28, a pipe 29 connecting the motor 18 and the pneumatic, and pipes 30, 30 one connecting each of the bellows 20 with the exhaust chest 27 as shown by Figs. 3 and 4. The exhaust chest 27 is divided by a partition 31 into two chambers 32 and 33. A port 34 provides communication between the interior of the pneumatic 28 and the chamber 32 and is opened and closed as hereinafter explained for the purpose of automatically controlling the flow of air from the motor to the exhaust pump. The partition 31 is provided with a triangular opening 35, (see Fig. 2) which is adapted to be regulated by a sliding plate 36 usually called a "tempo valve." The means here shown for regulating the tempo valve includes a stem 37, a hand lever 38, a rock shaft 39 affixed to the hand lever, an arm 40 affixed to the rear end of the rock shaft, a swinging arm 41 mounted upon a fulcrum 42, a pivoted link 43 connecting the arms 40 and 41, and a pivoted link 44 connecting the arm 41 with the stem 37. It is not to be understood that the tempo valve here shown and its actuating mechanism form any part of the present invention. The air conduit may be traced from the motor 18 through the pipe 29 into the pneumatic 28, through the port 34, chamber 32, port 35, chamber 33 and either one of the branch pipes 30 together with their respective bellows. The air is exhausted from the bellows through ports 45 which are normally covered by clappers 46. The supply for the exhaust pump is presumably taken from the atmosphere through the motor 18.

The essential features of the present invention are embodied in the pneumatic 28 and the several parts associated therewith and hereinafter described. The pneumatic 28 includes a movable leaf 47 and a leaf spring 48 tending to move the leaf 47 to open position. The spring 48 comprises two leaves fastened together at 49 and provided with a slide 51 embracing both leaves and adapted to be moved toward and from the point 49 for varying the tension of the spring. On the movable leaf 47 of the pneumatic is affixed a beveled valve 50 whose oblique face is arranged to coöperate with the port 34 connecting the pneumatic and the exhaust chest 27. In the drawings, the pneumatic is shown in open position in which the valve 50 is entirely withdrawn from the port 34.

The operation for automatically controlling the flow of air to the exhaust pump is as follows:—For example supposing the pedal levers are actuated so fast as to cause the exhaust pump to draw through the air conduit a greater supply of air than the amount which may readily pass through the tempo valve opening 35. This causes an excessive vacuum in the chamber 32 of the exhaust chest. A corresponding vacuum exists in the pneumatic 28 which is thereby compressed so as to cause the movable leaf 47 to move toward the port 34. The smaller end of the valve 50 enters the port 34 thereby restricting the air conduit at that point and compensating for the excessive vacuum developed by the pump. On the other hand, if the movements of the exhaust pump should diminish, the vacuum in the pneumatic 28 would decrease, thus enabling the spring 48 to move the leaf 47 to open position and thus provide a greater opening in the air conduit at the port 34. It will thus be seen that the flow in the air conduit is varied inversely as the tension developed by the exhaust pump. In the first instance explained, the flow at the port 34 was under relatively great pressure but through a relatively smaller opening, while in the second instance, the flow at that point was under a relatively low pressure but through a relatively large opening, the result being that the motive force in the motor 18 was in each case the product of the flow and pressure which, when so combined, give substantially the same motive force under all conditions.

The valve 50 which is included in Figs. 3 and 4 is perhaps the simplest and least expensive, and is produced from a cylindrical plug cut obliquely so as to leave an oblique face 50'. The fact that the plug is circular in cross-section and that the face 50' is oblique results in the shape or outline given said face in Fig. 4. The face is approximately pointed at its forward and rear extremes and its greatest width is midway between said extremes. When the pointed end of the valve is inserted in a circular port such as that indicated at 34, the initial and terminal rates of change in the degrees of cut-off are relatively slight and the rate of change when the controlling face is one-half within and one-half without the port is maximum.

It may in some cases be found desirable to provide a valve whose initial rate of change is minimum and whose rate of change in proportion to successive increments of movement shall increase through its entire movement. A valve adapted to give the latter result is shown by Fig. 5, in which the controlling portion of the valve indicated at 150 is conical.

The valve shown by Fig. 6 and indicated at 60 is rectangular in cross section and its controlling portion is formed with diverging controlling faces 61, which give the valve a shape similar to that of a chisel. The effect produced by the valve 60 is uniform with regard to the rate of cut-off.

Fig. 7 shows a valve 70 which is rectangular in cross section and which is formed with converging controlling faces 71. The effect of the valve 70 is uniform like that of the valve 60. The valve 80 shown by Fig. 8 is likewise rectangular in cross section but has a single controlling face indicated at 81. The face 81 is oblique to the line of travel and its effect is a uniform rate of change in cut-off.

It is to be understood that the valve of whatever cross-section it may be is intended to be employed in connection with a port of similar cross section. The forms here shown illustrate only a few of the shapes which may be employed and it will be understood that other shapes are within the scope of the present invention provided the controlling face or faces are oblique to the line of movement.

I claim:—

1. In an automatic piano, a pneumatic motor, an exhaust pump and conduit communicating therewith, said conduit including a port, and a valve movable endwise in and out of said port, said valve having an operative face which is oblique to its line of travel and which increases in width from its front and rear extremes toward the intermediate portion.

2. In an automatic piano, a pneumatic motor, an exhaust pump and conduit communicating therewith, said conduit including a pneumatic and a port opening into the pneumatic, and a valve mounted on the movable wall of the pneumatic so as to move endwise in and out of said port, said valve having a controlling surface inclined to the line of travel and formed of graduated width narrower toward the ends and broader between the ends.

3. In an automatic piano, a pneumatic motor, an exhaust pump and conduit communicating therewith, said conduit including a port, and a valve movable endwise in and out of said port, said valve having an operative face which is oblique to the line of travel, and of which the side edges converge toward the rear end.

In testimony whereof I have affixed my signature, in presence of two witnesses.

ALBERT H. STUART.

Witnesses:
E. BATCHELDER,
W. P. ABELL.